United States Patent
Song

(10) Patent No.: US 6,749,244 B1
(45) Date of Patent: Jun. 15, 2004

(54) OVERHEAD STORAGE SYSTEM FOR A MOTOR VEHICLE

(75) Inventor: Yu-Jin Song, Sterling Heights, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/330,866

(22) Filed: Dec. 27, 2002

(51) Int. Cl.⁷ .............................. B60R 7/07
(52) U.S. Cl. ..................... 296/37.7; 296/37.8
(58) Field of Search ............... 296/37.1, 37.7, 296/37.8, 24.34; 224/309, 321, 328

(56) References Cited

U.S. PATENT DOCUMENTS

| | | | |
|---|---|---|---|
| 4,101,159 A | 7/1978 | Stewart | 296/37.7 |
| 4,867,498 A | 9/1989 | Delphia et al. | 296/37.7 |
| 4,941,718 A | 7/1990 | Alexander, III et al. | 312/312 |
| 5,040,990 A | 8/1991 | Suman et al. | 439/34 |
| 5,106,141 A | 4/1992 | Mostashari | 296/24.1 |
| 5,522,638 A | 6/1996 | Falcoff et al. | 296/37.8 |
| 5,669,494 A * | 9/1997 | Geffen | 211/40 |
| 5,775,761 A | 7/1998 | Asami et al. | 296/37.7 |
| 5,823,599 A | 10/1998 | Gray | 296/37.8 |
| 5,851,046 A * | 12/1998 | Kalkman et al. | 296/97.9 |
| 5,927,784 A * | 7/1999 | Vitito | 296/37.7 |
| 6,006,971 A | 12/1999 | Coleman et al. | 224/404 |
| 6,135,529 A * | 10/2000 | De Angelis et al. | 296/37.8 |
| 6,157,418 A * | 12/2000 | Rosen | 296/37.7 |
| 6,176,536 B1 | 1/2001 | Miller et al. | 296/37.7 |
| 6,186,459 B1 * | 2/2001 | Ma | 296/37.7 |
| 6,246,449 B1 * | 6/2001 | Rosen | 296/37.7 |
| 6,253,976 B1 | 7/2001 | Coleman et al. | 224/404 |
| 6,267,428 B1 | 7/2001 | Baldas et al. | 296/37.7 |
| 6,273,277 B1 * | 8/2001 | Geldenhuys | 211/70 |
| 6,338,517 B1 * | 1/2002 | Canni et al. | 296/37.8 |
| 6,339,455 B1 * | 1/2002 | Allan et al. | 296/37.7 |
| 6,361,012 B1 * | 3/2002 | Chang | 296/37.8 |
| 6,557,812 B2 * | 5/2003 | Kutzehr et al. | 296/37.7 |
| 6,588,609 B1 * | 7/2003 | Richet et al. | 211/163 |
| 2002/0163219 A1 * | 11/2002 | Clark et al. | 296/37.8 |

FOREIGN PATENT DOCUMENTS

| | | |
|---|---|---|
| EP | 0 652 129 A1 | 10/1994 |
| FR | 2 684 622 A1 | 9/1991 |
| JP | 6-270747 | 9/1994 |
| JP | 2000-142247 | 5/2000 |

\* cited by examiner

Primary Examiner—D. Glenn Dayoan
Assistant Examiner—H. Gutman
(74) Attorney, Agent, or Firm—Bliss McGlynn, P.C.; Bill Panagos

(57) ABSTRACT

An overhead-storage system for the interior of a motor vehicle having a headliner and defining a passenger compartment includes a housing having at least one convenience feature supported in the housing and adapted for use by a passenger of the vehicle. The housing is operatively supported for rotational movement relative to the headliner and about a rotational axis of the housing such that the at least one convenience feature may be selectively moved angularly relative to the rotational axis into close proximity of the passenger.

18 Claims, 4 Drawing Sheets

OVERHEAD STORAGE SYSTEM FOR A MOTOR VEHICLE

BACKGROUND OF THE INVENTION

1. Field of the Invention

The present invention relates, generally, to an overhead-storage system for the passenger compartment of a motor vehicle and, more specifically, to such an overhead-storage system that is rotatably supported relative to the headliner of the vehicle.

2. Description of the Related Art

Some passenger vehicles include overhead-storage systems, or overhead consoles, that are attached to the roof of the vehicle. Typically, a console is centrally located between the lateral edges of the headliner of the roof and extends for a portion of the longitudinal axis of the roof from the forward end of the interior of the passenger compartment toward the rear of the vehicle. Generally, the console is fixedly supported relative to the headliner and includes a plastic housing that extends along the length of the console. Usually, a single console is designed for the platform of a particular vehicle due to differences in shapes and sizes of the headliners and the panels of the roofs. The console can be equipped with various convenience features, including displays, controls, and compartments that are accessible to occupants of the vehicle. More specifically, these convenience features may include controls for a climate-control system, driver-information-display screens, light modules, small storage compartments, and the like.

Overhead consoles are manufactured in various lengths, depending upon the features included in the console and type of vehicle. For example, a console having just light modules or a driver-information-display screen may be designed for use primarily by the driver and front-seat passenger of the vehicle and, therefore, have only a relatively short length. Other types of consoles have more convenience features, such as multiple storage compartments and controls for various systems of the vehicle that are designed to be accessed by other passengers. Thus, these consoles can extend into the rear portion of the passenger compartment relatively remote from the position of the front passengers. In these cases, many of the controls and other convenience features are not easily accessible to the front passengers. In addition, certain convenience features that may be accessible to passengers seated on one side of the centerline of the passenger compartment are not as easily accessible to passengers seated on the opposite side of the centerline. Accordingly, in certain circumstances, passengers may feel the need to rise from their seats to access a convenience feature located on a remote portion of a console.

While overhead consoles known in the related art provide many convenience features that are in demand by consumers, the physical size of the passenger compartment of some vehicles, for example, vans and sport-utility vehicles (SUVs), makes the convenience features difficult to access by each passenger. Accordingly, there remains a need in the related art for an overhead console that provides improved access to the convenience features presented by the console. Furthermore, there is a need in the related art for an overhead console that improves the safety associated with providing access to the convenience features presented by the console.

SUMMARY OF THE INVENTION

The present invention overcomes the disadvantages in the related art in an overhead-storage system for the interior of a motor vehicle having a headliner and defining a passenger compartment that includes a housing having at least one convenience feature supported in the housing and adapted for use by a passenger of the vehicle. The housing is operatively supported for rotational movement relative to the headliner and about a rotational axis of the housing such that the at least one convenience feature may be selectively moved angularly relative to the rotational axis into close proximity of the passenger.

The overhead-storage system of the present invention provides improved access to the convenience features presented by the system relative to overhead-storage systems of the related art. Furthermore, the overhead-storage system of the present invention improves the safety associated with providing access to the convenience features presented by the system relative to overhead-storage systems of the related art.

DETAILED DESCRIPTION OF THE INVENTION

An overhead-storage system for a motor vehicle according to the present invention is generally indicated at 10 throughout the figures, where like numerals are used to designate like structure. Although the system 10 is described below and shown in the figures used in connection with the interior of a motor vehicle in general, those having ordinary skill in the art will appreciate that the system 10 is adapted for particular use within the interior of relatively large vehicles, such as vans and sport-utility vehicles (SUVs), in which the passenger compartments are considerably more spacious than those of smaller vehicles.

Figure 4:
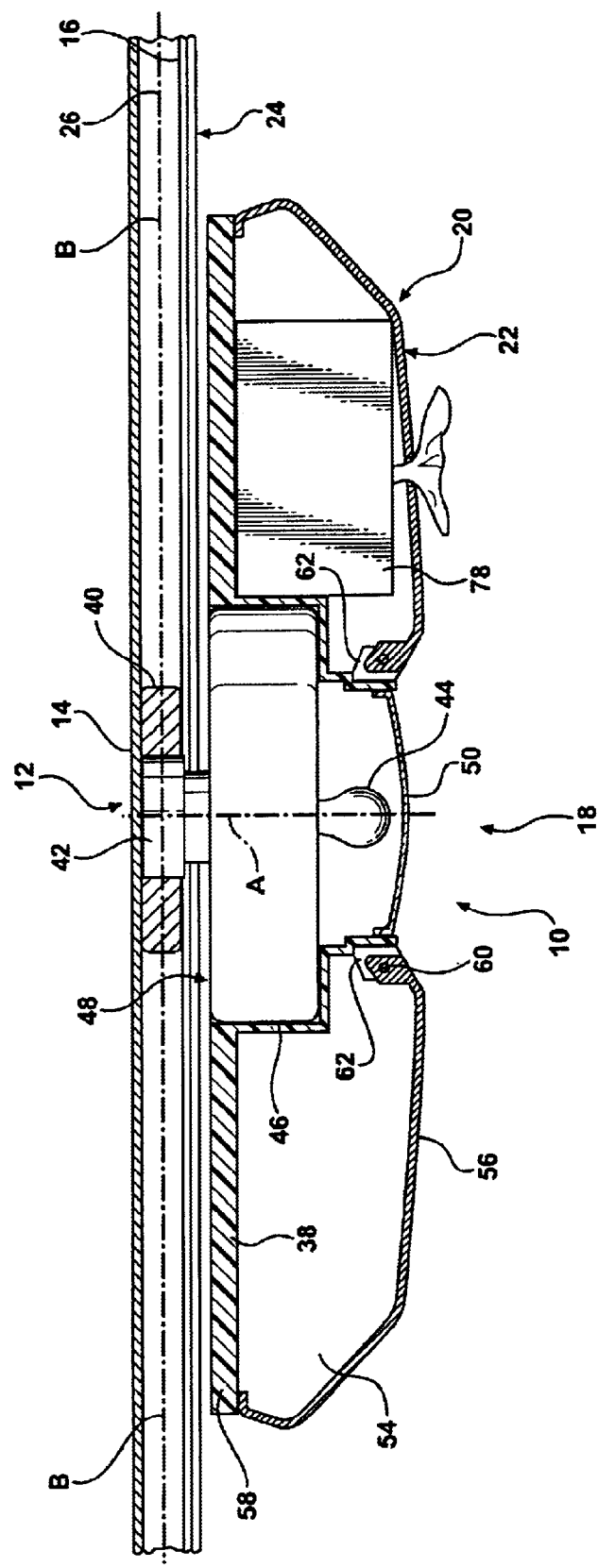
FIG. 4 is an elevational cross-sectional side view of the overhead-storage system for a motor vehicle of the present invention.

Referring initially to FIG. 4, the roof of a motor vehicle is generally indicated at 12. The roof 12 includes a panel 14 defining the exterior of the vehicle and a headliner 16 spaced from and substantially parallel with the panel 14. In FIG. 4, the panel 14 is shown disposed substantially co-extensive in all directions with the headliner 16. Also, the vehicle is shown having a passenger compartment or enclosure, generally indicated at 18, that is defined by the space adjacent the headliner 16 opposite the panel 14. The passenger compartment 18 is adapted to seat passengers of the vehicle and is shown in FIG. 4 disposed substantially co-extensive with the headliner 16 in all directions as well.

Figure 1:
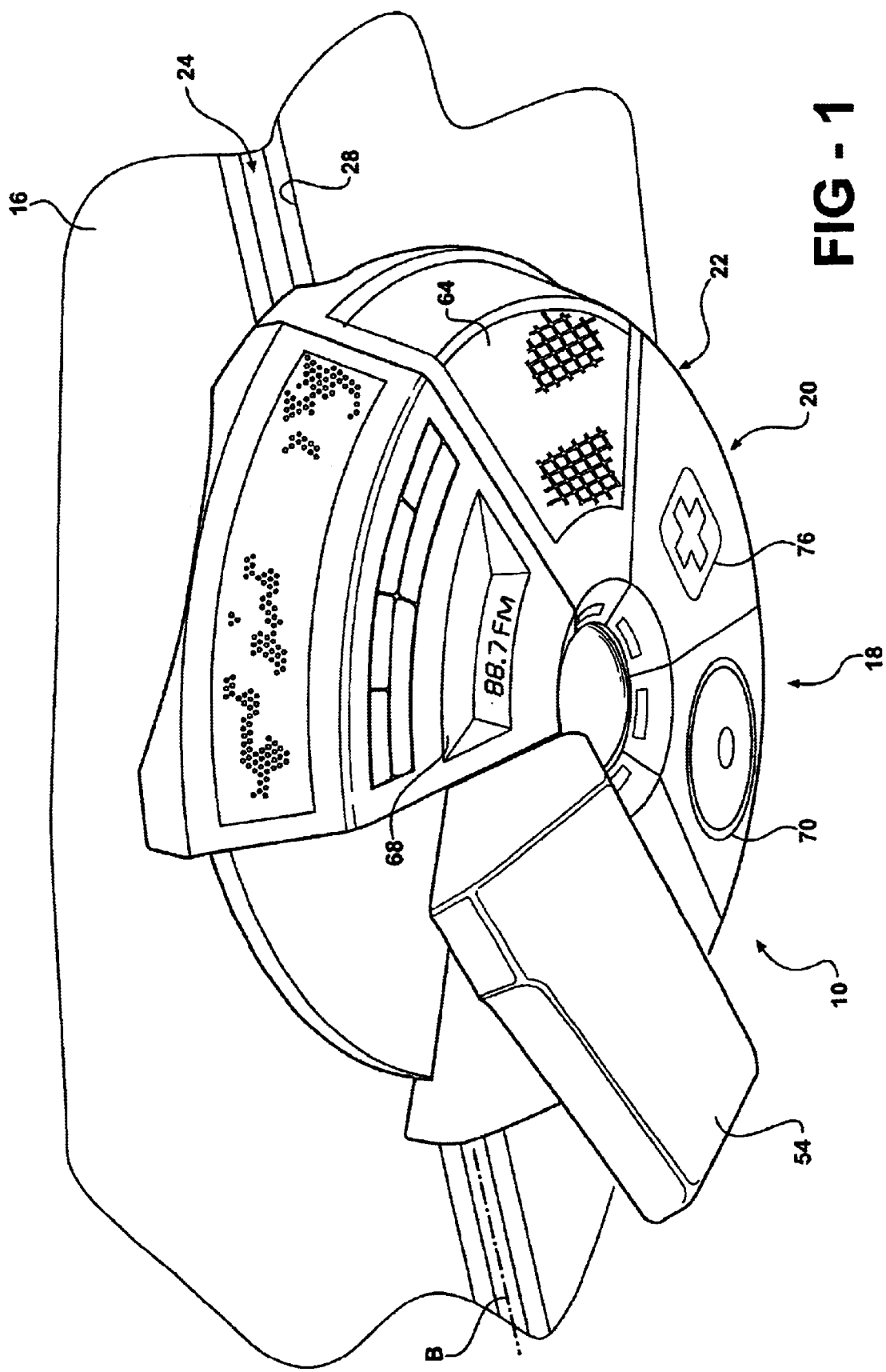
FIG. 1 is an environmental view of the overhead-storage system for a motor vehicle of the present invention shown supported relative to a headliner of the interior of a passenger vehicle and with one of the storage compartments of the system in an open disposition.
Figure 2:
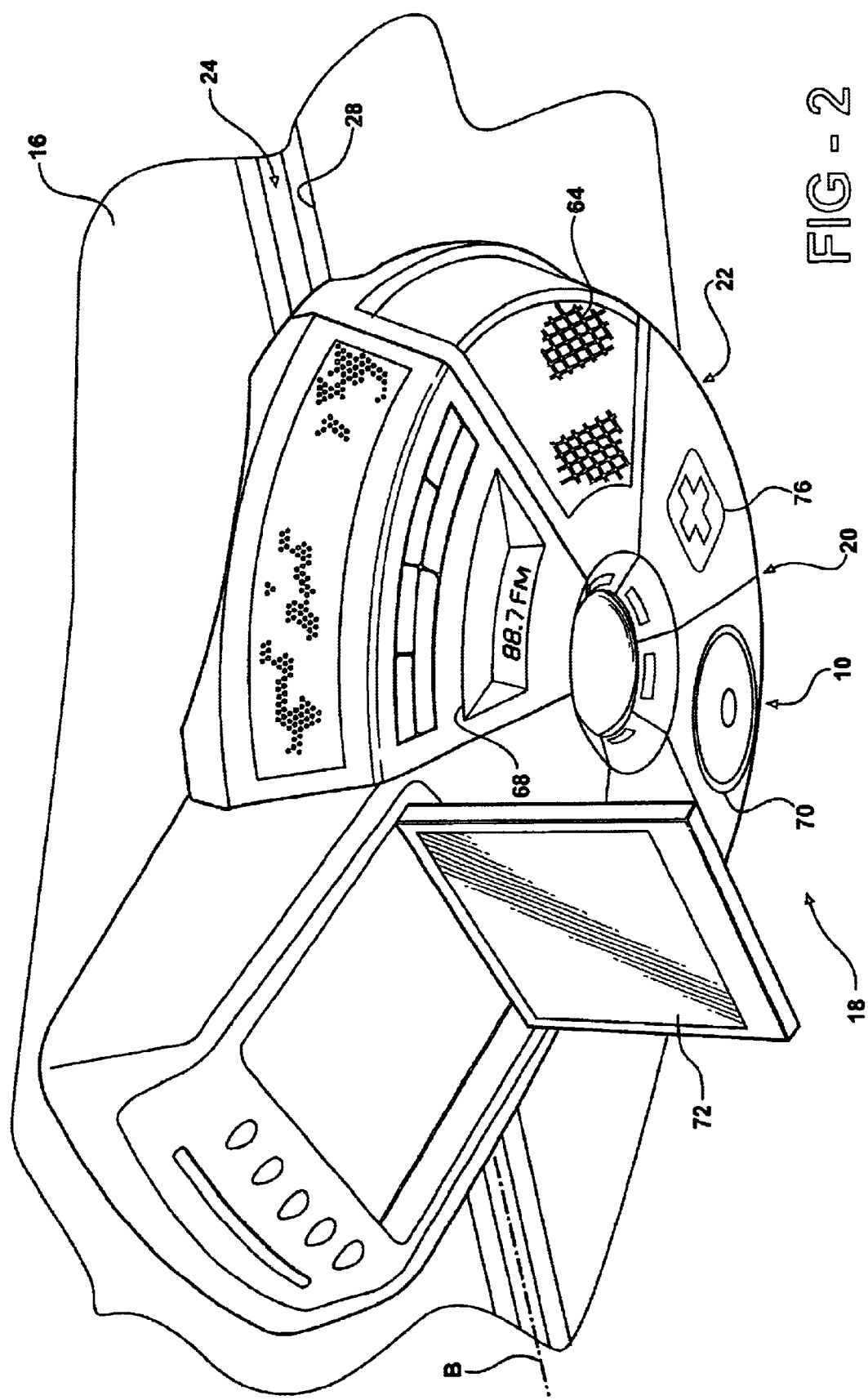
FIG. 2 is an environmental view of the overhead-storage system for a motor vehicle of the present invention shown supported relative to a headliner of the interior of a passenger vehicle and with an LCD screen of the system deployed.
Figure 3:
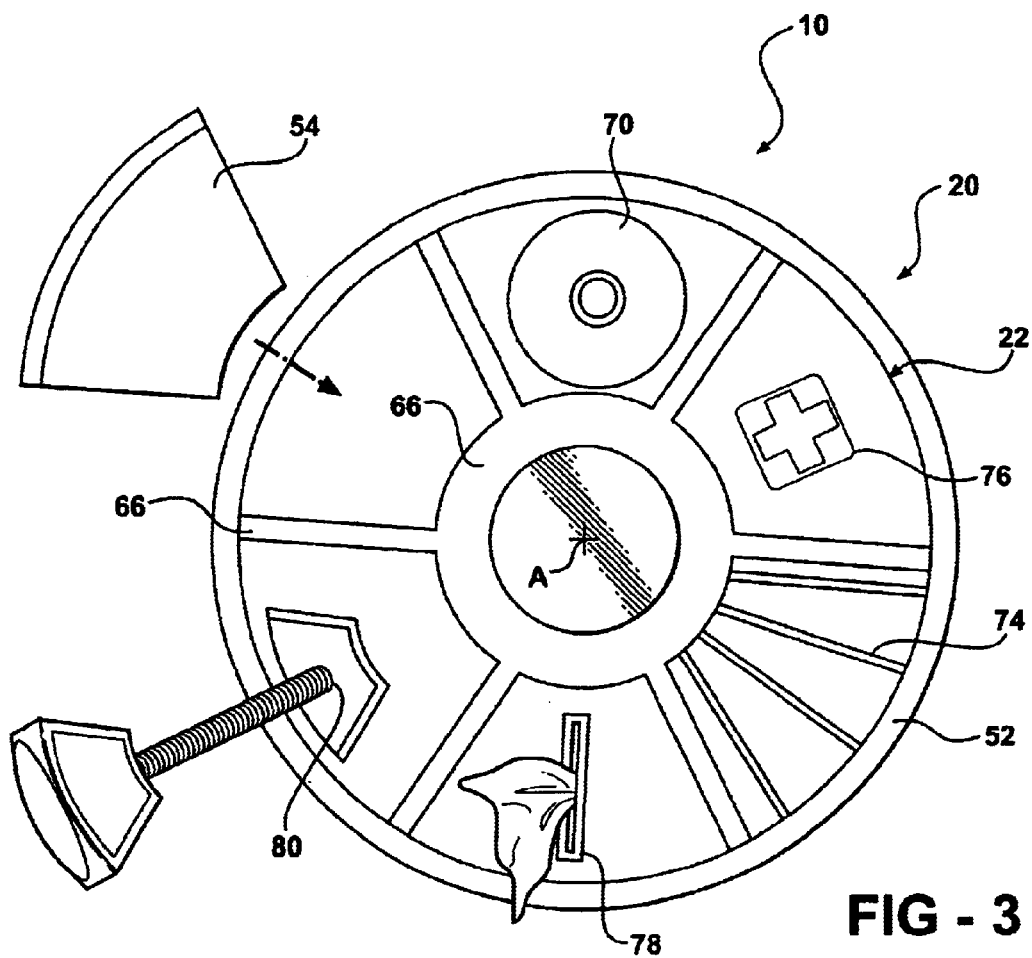
FIG. 3 is an elevational bottom view of the overhead-storage system for a motor vehicle of the present invention showing various uses of the storage compartments of the system.

Referring now to FIGS. 1 through 4, the system 10 includes a housing, generally indicated at 20, having at least one convenience feature, generally indicated at 22 and which is described in detail below, supported in the housing 20 and adapted for use by a passenger of the vehicle. The housing 20 is operatively supported for rotational movement relative to the headliner 16 about a rotational axis "A" that is co-extensive with a centerline of the housing 20. As best shown in FIGS. 3 and 4, the housing 20 rotates such that one or more convenience features 22 may be selectively moved angularly relative to the rotational axis "A" into close proximity of the passenger.

As shown in FIGS. 1, 2, and 4, the system 10 further includes a rail, generally indicated at 24. The rail 24 is operatively supported relative to the headliner 16 and defines a longitudinal axis "B." Thus, in addition to its ability to rotate, the housing 20 is operatively supported for rectilinear movement within the passenger compartment 18. In a preferred embodiment of the system 10, the rail 24 is disposed substantially co-extensive with the headliner 16 in the direction of the longitudinal axis "B." Also, the rail 24 is operatively supported relative to a substantial centerline of the headliner 16. However, those having ordinary skill in the art will appreciate that the rail 24 can have any suitable disposition relative to the headliner 16 and the housing 20.

Figure 5:
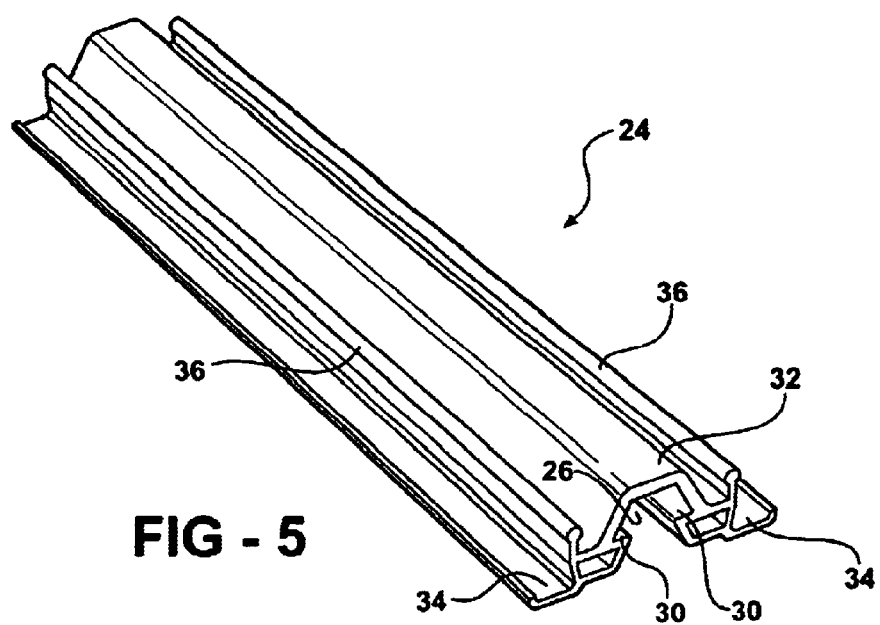
FIG. 5 is a perspective view of the rail of the overhead-storage system for a motor vehicle of the present invention.

Referring specifically to FIG. 5, the rail 24 defines a longitudinally extending channel 26 that opens downwardly in the direction of the passenger compartment 18 through an opening 28, as shown in FIGS. 1 and 2, in the headliner 16. The channel 26 extends along a substantially central portion of the rail 24. Also, the channel 26 includes a pair of opposed, longitudinally extending, substantially parallel tracks 30 disposed on lateral sides of the channel 26.

The rail 24 further includes a dome portion 32 disposed spaced from and cooperating with the tracks 30 to define the channel 26. A pair of flanges 34 extend laterally relative to the channel 26 and along the length of the rail 24. The flanges 34 are adapted to be juxtaposed to the headliner 16 opposite the passenger compartment 18. A pair of upstanding ribs 36 extend along a substantial portion of the length of the rail 24. The ribs 36 are adapted to fasten the rail 24 to the roof 12 using any suitable means known in the related art.

In a preferred embodiment of the system 10 and as best shown in FIGS. 1 and 2, the housing 20 is of a substantially disk-like shape. However, those having ordinary skill in the art will appreciate that the housing 20 can be of any suitable shape and size and be disposed relative to the headliner 16 at any suitable angle. As best shown in FIG. 4, the housing 20 includes a back surface 38 located opposite the convenience feature 22 and operatively supported adjacent the headliner 16. Further, the back surface 38 is supported by the rail 24 for rectilinear movement within the passenger compartment 18. The housing 20 includes at least one bushing 40, shown in FIG. 4, supported for rectilinear movement along the channel 26. The bushing 40 is operatively connected to a base 42 or a motor that is supported to the housing 20. The motor 42 may be employed to power the bushing 40 to move the housing 20 along the tracks 30. Alternatively, the housing 20 may be manually moveable both rotationally and rectilinearly. In one preferred embodiment of the system 10, the housing 20 includes a pair of bushings 40 supported for rectilinear movement along the tracks 30. Those having ordinary skill in the art will appreciate that the bushings 40 can be roller bearings or any other suitable type of bushing arranged in the tracks 30 for reducing friction between the bushings 40 and the tracks 30.

As best shown in FIG. 4, the convenience feature 22 may include a source of light 44 supported substantially coaxially relative to the rotational axis "A." The source of light 44 is supported within an electronics housing 46 defined by the substantially central portion, generally indicated at 48, of the housing 20. The electronics housing 46 includes a concave lens 50 disposed in an opening in the electronics housing 46 and spaced with respect to the source of light 44. In FIG. 4, the source of light 44 is shown as an incandescent light bulb. However, those having ordinary skill in the art will appreciate that the source of light 44 can be any suitable source of light. In a preferred embodiment of the system 10 and as best shown in FIG. 3, the housing 20 may also include a secondary source of light 52 disposed about the perimeter of the face of the housing 20 proximate the passenger compartment 18. In a preferred mode of this embodiment, the light of the secondary source 52 may be fluorescent.

As noted above, the system 10 includes at least one convenience feature 22, but preferably a plurality of convenience features 22. For example and as best shown in FIG. 4, the convenience feature 22 may include at least one storage compartment 54 operatively supported in the housing 20 for rotational movement relative to the headliner 16 such that the storage compartment 54 may be selectively moved angularly relative to the rotational axis "A" into close proximity of the passenger. The storage compartment 54 may include a door 56 that is hingedly connected to the housing 20 and operable to open in a substantially downward fashion. More specifically, one end of the door 56 is supported adjacent the rim 58 of the back surface 38. The other end of the door 56 is hingedly connected to the electronics housing 46. To this end, a pin 60 extends through a boss 62 formed on the electronics housing 46.

The storage compartment 54 is easily operated. In particular, the closed storage compartment 54 is adapted to drop downwardly and swing open at an angle relative to the longitudinal axis "B," as viewed in FIG. 4, to create sufficient clearance and access such that a passenger can comfortably use the storage compartment 54. In addition, the hinge 60 may act to dampen movement of the door 56 from its closed to its open position. Alternatively, the storage compartment 54 also can be detached from the housing 20, as shown in FIG. 3, for customization of the storage compartment 54, as described in detail below.

The storage compartment 54 may also include a door-less storage compartment 54 having a netted covering 64, as shown in FIGS. 1 and 2. The storage compartment 54 is adapted to receive and store any number of devices including, but not limited to, currency, flashlights, cell phones, notes/school supplies, tools, jumper cables, and sporting equipment. Those having ordinary skill in the art will appreciate that the system 10 is in no way limited by the types of devices that may be stored in the system 10.

As shown in FIGS. 1 through 4, in one embodiment of the system 10, the housing 20 may include a plurality of storage compartments 54 annularly spaced about the rotational axis "A." As best shown in FIG. 3, a partition 66 can separate a storage compartment 54 from each adjoining storage compartment 54 and the electronics housing 46 from the storage compartments 54. Alternatively and as best shown in FIGS. 1 through 3, the convenience features 22 may include a radio receiver 68, a CD holder 70, a liquid-crystal-display screen 72, an audio speaker 74, a first-aid kit 76, a tissue holder 78, and an articulated source of light 80 adapted to be extendable from the housing 20. In this preferred mode and as shown in FIG. 2, the liquid-crystal-display screen 72 is hingedly supported relative to the housing 20 and adapted to be deployed in a position substantially perpendicular to the headliner 16. By way of example and not by way of limitation, the convenience features 22 may also include a DVD player, headphone plug-ins, an extendable hanger rod, air-filtration and voice-activation devices, temperature/radio controls, and heating/cooling vents. Those having ordinary skill in the art will appreciate that any suitable number and kinds of convenience features 22 may be employed in the housing 20 without departing from the scope and spirit of the system 10.

The system 10 is shown in the figures having six convenience features 22 of substantially equal shape and size. However, those having ordinary skill in the art will appreciate that the system 10 can have any suitable number of convenience features 22 of various suitable shapes and sizes. Those having ordinary skill in the art will also appreciate that the passengers of the vehicle can rotationally and rectilinearly move the housing 20 through operation of the motor 42 and/or manually. To this end, electrical power may be supplied to the motor 42, which drives the bushings 40 via the tracks 30 in the rail 24. Electrical current is supplied to the electrically powered devices through contact between the bushings 40 and these devices. In this way, the rotational and rectilinear movement of the housing 20 relative to the rail 24 may be powered.

With the multi-functional system 10, access to the convenience features 22 presented by the system 10 is improved relative to overhead-storage systems of the related art. Furthermore, with the multi-functional system 10, the safety associated with providing access to the convenience features 22 presented by the system 10 is improved relative to overhead-storage systems of the related art.

The present invention has been described in an illustrative manner. It is to be understood that the terminology that has been used is intended to be in the nature of words of description rather than of limitation. Many modifications and variations of the present invention are possible in light of the above teachings. Therefore, within the scope of the appended claims, the present invention may be practiced other than as specifically described.

What is claimed is:

1. An overhead-storage system for the interior of a motor vehicle having a roof and a headliner and defining a passenger compartment, said overhead-storage system comprising:

a housing including at least one convenience feature supported in said housing and adapted for use by a passenger of the vehicle, said housing operatively supported for rotational movement relative to the headliner and about a rotational axis of said housing such that said at least one convenience feature may be selectively moved angularly relative to said rotational axis into close proximity of the passenger; and a rail operatively supported relative to the headliner and defining a longitudinal axis, said housing supported by said rail for rectilinear movement along said longitudinal axis within the passenger compartment of the vehicle, said rail also defining a longitudinally extending channel that opens downwardly in the direction of the passenger compartment of the vehicle through an opening in the headliner, said housing including at least one bushing supported for rectilinear movement along said channel.

2. An overhead-storage system as set forth in claim 1, wherein said channel includes a pair of opposed, longitudinally extending, substantially parallel tracks, said housing including a pair of bushings supported for rectilinear movement along said tracks.

3. An overhead-storage system as set forth in claim 2, wherein said rail includes a dome portion disposed spaced from and cooperating with said pair of tacks to define said channel.

4. An overhead-storage system as set forth in claim 1, wherein said rail includes a pair of flanges extending laterally relative to said channel and, along the length of said rail, said pair of flanges adapted to be juxtaposed to the headliner of the vehicle opposite the passenger compartment.

5. An overhead-storage system as set forth in claim 1, wherein said rail includes a pair of upstanding ribs extending along a substantial portion of the length of said rail, said pair of ribs adapted to fasten said rail to the roof of the vehicle.

6. An overhead-storage system as set forth in claim 1, wherein said at least one convenience feature includes a source of light supported substantially coaxially relative to said rotational axis.

7. An overhead-storage system as set forth in claim 1, wherein said at least one convenience feature includes at least one storage compartment operatively supported in said housing for rotational movement relative to the headliner such that said at least one storage compartment may be selectively moved angularly relative to said rotational axis into close proximity of the passenger.

8. An overhead-storage system as set forth in claim 7, wherein said at least one storage compartment includes a door that is hingedly connected to said housing and operable to open in a substantially downward fashion.

9. An overhead-storage system as set forth in claim 1, wherein said at least one convenience feature includes a plurality of storage compartments annularly spaced about said rotational axis.

10. An overhead-storage system as set forth in claim 1, wherein said at least one convenience feature includes at least one item from a group of items consisting of a radio receiver, CD player, DVD player, liquid-crystal-display screen, audio speaker, first-aid kit, tissue holder, and an articulated source of light adapted to be extendable from said housing.

11. An overhead-storage system as set forth in claim 10, wherein said liquid-crystal-display screen is hingedly supported relative to said housing and adapted to be deployed in a position substantially perpendicular to the headliner.

12. An overhead-storage system for the interior of a motor vehicle having a headliner and defining a passenger compartment, said overhead-storage system comprising:

a housing and a rail, said rail operatively supported relative to the headliner and defining a longitudinal axis, said housing supported by said rail for rotational movement relative to the headliner about a rotational axis and rectilinear movement along said longitudinal axis within the passenger compartment of the vehicle, said housing including a plurality of convenience features supported in said housing and annularly spaced about said rotational axis such that said convenience features may be selectively moved angularly relative to said rotational axis and rectilinearly along said longitudinal axis into close proximity of a passenger of the vehicle.

13. An overhead-storage system as set forth in claim 12, wherein said rail defines a longitudinally extending channel that opens downwardly in the direction of the passenger compartment of the vehicle through an opening in the headliner, said housing including at least one bushing supported for rectilinear movement along said channel.

14. An overhead-storage system as set forth in claim 13, wherein said channel includes a pair of opposed, longitudinally extending, parallel tracks, said housing including a pair of bushings supported for rectilinear movement along said pair of tracks.

15. An overhead-storage system as set forth in claim 12, wherein said plurality of convenience features includes at least one source of light supported substantially coaxially relative to said rotational axis.

16. An overhead-storage system as set forth in claim 12, wherein said plurality of convenience features includes at least one storage compartment operatively supported in said housing for rotational movement relative to the headliner such that said at least one storage compartment may be selectively moved angularly relative to said rotational axis into close proximity of the passenger.

17. An overhead-storage system as set forth in claim 16, wherein said at least one storage compartment includes a door that is hingedly connected to said housing and operable to open in a substantially downward fashion.

18. An overhead-storage system as set forth in claim 12, wherein said plurality of convenience features includes at least one item from a group of items consisting of a radio receiver, CD player, DVD player, liquid-crystal-display screen, audio speaker, first-aid kit, tissue holder, and an articulated source of light adapted to be extendable from said housing.

* * * * *